US008728646B2

(12) United States Patent
Chang et al.

(10) Patent No.: US 8,728,646 B2
(45) Date of Patent: May 20, 2014

(54) BATTERY LOCK STRUCTURE FOR ELECTRONIC DEVICE

(75) Inventors: Jen-Ho Chang, Yangmei Township, Taoyuan County (TW); Chien-Chiang Huang, Taoyuan (TW)

(73) Assignee: Quanta Computer Inc., Taoyuan Shien (TW)

( * ) Notice: Subject to any disclaimer, the term of this patent is extended or adjusted under 35 U.S.C. 154(b) by 545 days.

(21) Appl. No.: 12/805,706

(22) Filed: Aug. 16, 2010

(65) Prior Publication Data
US 2011/0269004 A1    Nov. 3, 2011

(30) Foreign Application Priority Data

Apr. 29, 2010 (TW) ................................ 99207883 U

(51) Int. Cl.
*H01M 2/10* (2006.01)
(52) U.S. Cl.
USPC ............................................... 429/97; 429/96
(58) Field of Classification Search
None
See application file for complete search history.

(56) References Cited

U.S. PATENT DOCUMENTS

| 5,716,730 | A  | * | 2/1998 | Deguchi ........................... 429/97 |
| 6,515,450 | B1 | * | 2/2003 | Kaiho et al. .................... 320/112 |
| 2003/0112592 | A1 | * | 6/2003 | Shin et al. ...................... 361/683 |
| 2004/0038121 | A1 | * | 2/2004 | Song et al. ....................... 429/97 |

* cited by examiner

*Primary Examiner* — Barbara Gilliam
*Assistant Examiner* — Adam A Arciero
(74) *Attorney, Agent, or Firm* — Rabin & Berdo, P.C.

(57) ABSTRACT

A battery lock structure of an electronic device includes a main body and a fastener. The main body includes a concave area for accommodating a battery, wherein the concave area includes a latch hole and a stopping member. The fastener is arranged on the battery and includes a main latch, an auxiliary latch and a resilient member. The main latch is slidably connected with the battery. The auxiliary latch is connected with the main latch, and slid simultaneously with the main latch relative to the battery. The resilient member is connected with the fastener at an end and connected with the battery at an opposite end, whereby providing a resilient force for the fastener to be secured within the concave area. When the battery is fully accommodated within the concave area, the main latch engages within the latch hole. When the main latch is off the latch hole, the stopping member stops the auxiliary latch, and the stopping member has a width sufficient to enable the main latch not to engage within the latch hole when the auxiliary latch is off the stopping member.

6 Claims, 4 Drawing Sheets

US 8,728,646 B2

BATTERY LOCK STRUCTURE FOR ELECTRONIC DEVICE

RELATED APPLICATIONS

This application claims priority to Taiwan Application Serial Number 99207883, filed Apr. 29, 2010, which is herein incorporated by reference.

BACKGROUND

1. Field of Invention

The present invention relates to a battery lock structure of an electronic device.

2. Description of Related Art

There are several types of very popular portable electronic devices in the market, e.g. mobile phones, portable computers or game devices. These portable electronic devices are all equipped with batteries such that they can be operated anywhere.

Conventionally, when a large-size battery is assembled to a main body of an electronic device, the battery is necessarily equipped with two fasteners at two opposite sides so as to reliably secure itself to the main body of the electronic device. When a user desires to remove the battery, he needs to unlock the two fasteners of the battery simultaneously so as to remove it from the electronic device. This action often requires the user to use both his two hands to complete the action of removing the battery. It is somewhat inconvenient for the user to use both his two hands to remove the battery. For the forgoing reasons, there is a need for improving a conventional battery lock structure.

SUMMARY

It is therefore an objective of the present invention to provide an improved battery lock structure for an electronic device.

In accordance with the foregoing and other objectives of the present invention, a battery lock structure of an electronic device includes a main body and a fastener. The main body includes a concave area for accommodating a battery, wherein the concave area includes a latch hole and a stopping member. The fastener is arranged on the battery and includes a main latch, an auxiliary latch and a resilient member. The main latch is slidably connected with the battery. The auxiliary latch is connected with the main latch, and slid simultaneously with the main latch relative to the battery. The resilient member is connected with the fastener at an end and connected with the battery at an opposite end, whereby providing a resilient force for the fastener to be secured within the concave area. When the battery is fully accommodated within the concave area, the main latch engages within the latch hole. When the main latch is off the latch hole, the stopping member stops the auxiliary latch, and the stopping member has a width sufficient to enable the main latch not to engage within the latch hole when the auxiliary latch is off the stopping member.

According to an embodiment disclosed herein, the main latch slides along a first direction that is in substantial parallel with a long axis of the main latch. According to another embodiment disclosed herein, the auxiliary latch is bendable along a second direction that is substantially perpendicular to the long axis of the main latch.

According to another embodiment disclosed herein, a gap between the main latch and the auxiliary latch is larger than a bended distance of the auxiliary latch caused by engaging with the stopping member.

According to another embodiment disclosed herein, the main latch and the auxiliary latch are manufactured to form a unitary plastic member.

According to another embodiment disclosed herein, the auxiliary latch has a thinner and shorter cross-section than the main latch has.

According to another embodiment disclosed herein, the resilient member includes a compression spring.

According to another embodiment disclosed herein, the battery includes a restricting member to prevent the main latch from overly engaging within the latch hole.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
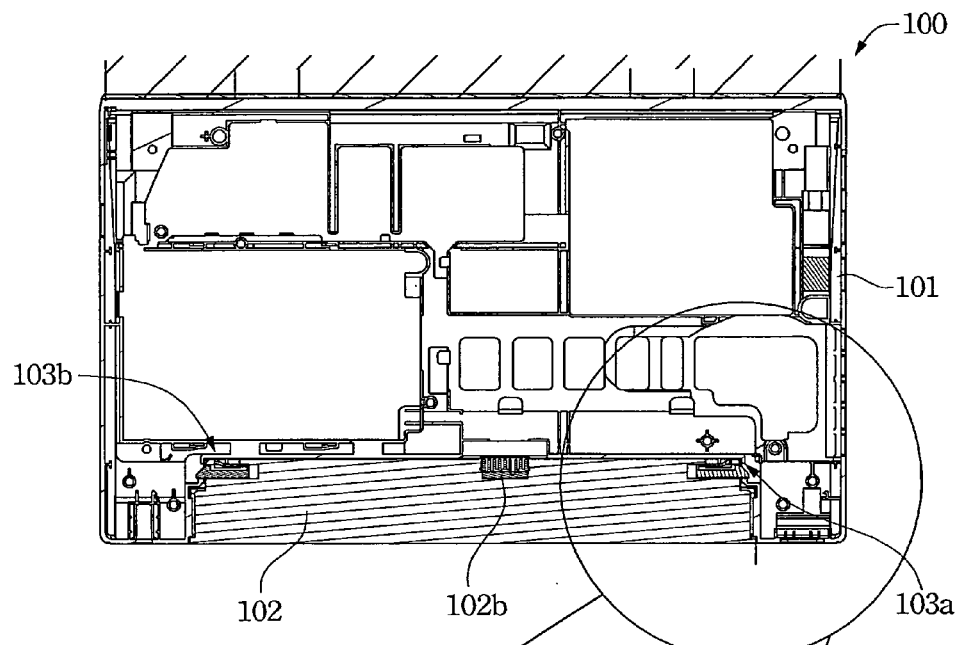
FIGS. 1, 3 and 5 illustrate respective cross-sectional views for a series of actions to remove a battery from an electronic device according an embodiment disclosed herein.

Reference will now be made in detail to the present preferred embodiments of the invention, examples of which are illustrated in the accompanying drawings. Wherever possible, the same reference numbers are used in the drawings and the description to refer to the same or like parts.

Figure 3:
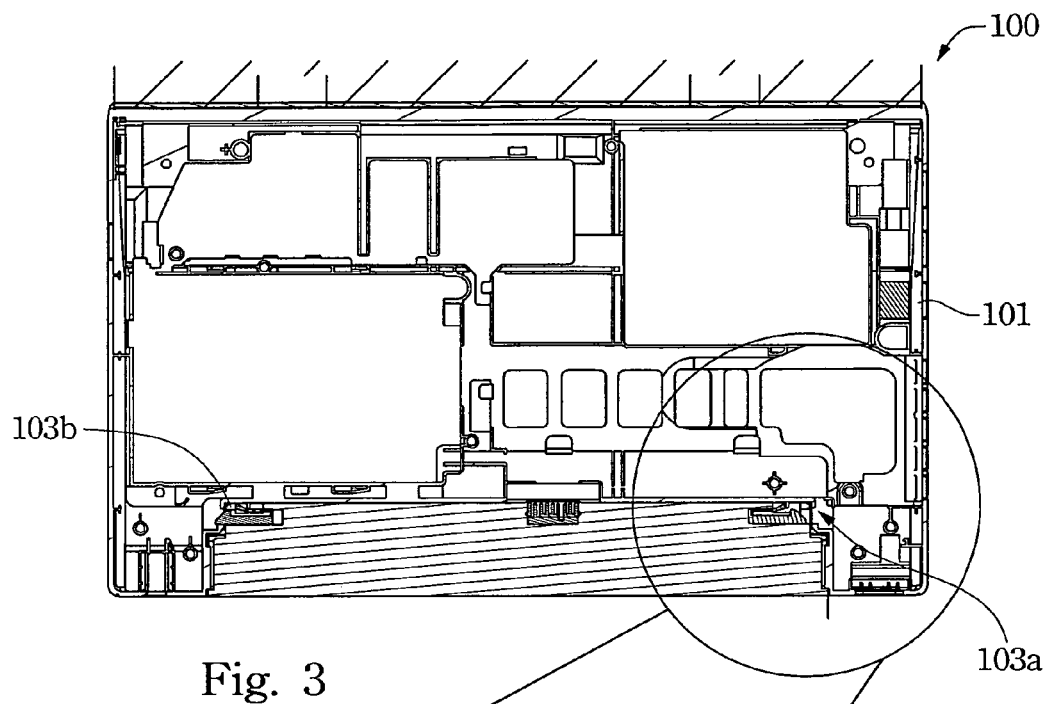
Figure 5:
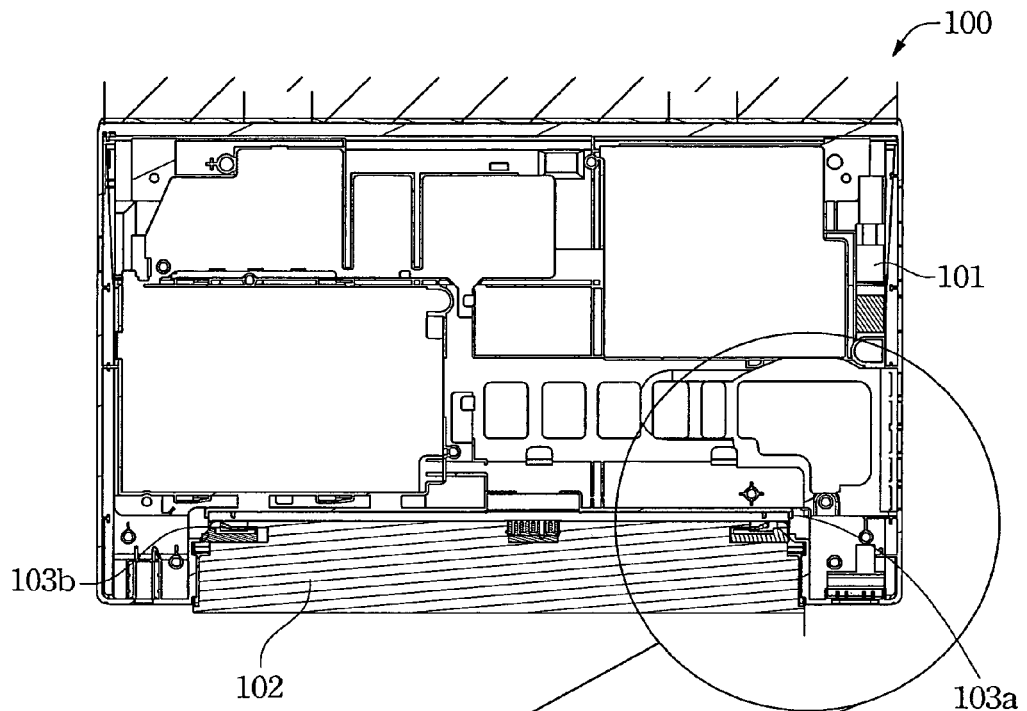

FIGS. 1, 3 and 5 illustrate respective cross-sectional views for a series of actions to remove a battery from an electronic device. An electronic device 100 has a main body 101, which is equipped with a concave area 101c (referring to FIG. 8) to accommodate a battery 102. The battery 102 has an electrical connector 102b to be electrically connected with the main body 101, thereby supplying power to the main body 101. Two opposite sides of the battery 102 have respective battery lock structures (103a, 103b), by which the battery 102 is secured within the concave area of the main body 101. The electronic device 100 has a resilient member 104, which is connected with a fastener 107 of each battery lock structure at an end and connected with the battery 102 at an opposite end.

Figure 2:
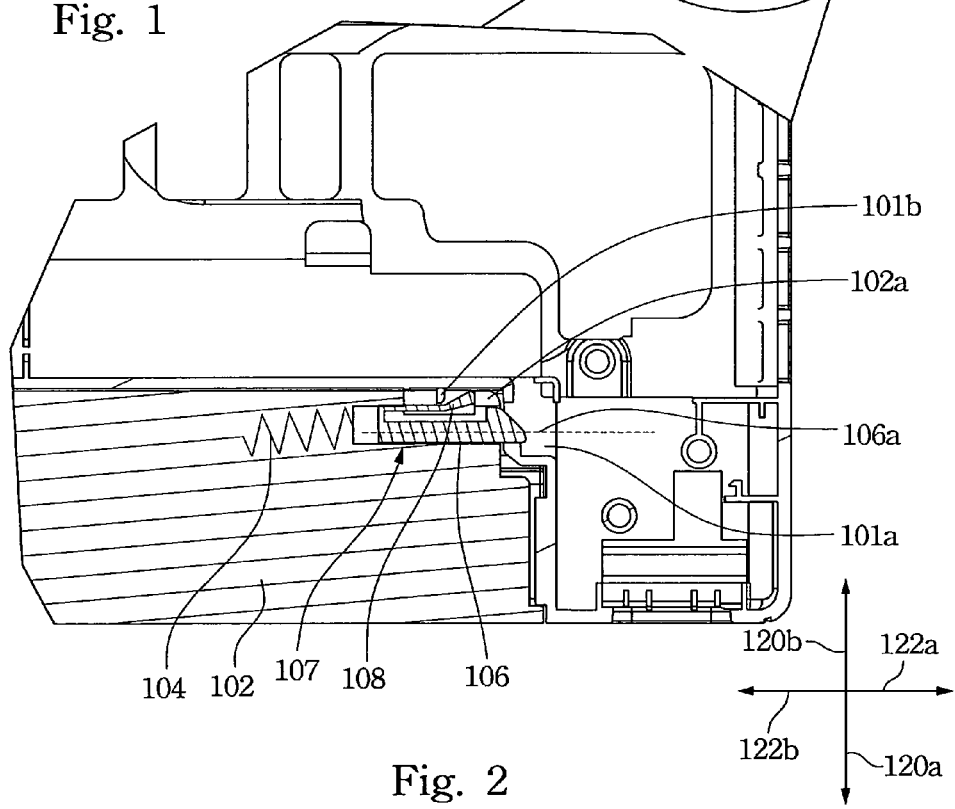
FIGS. 2, 4 and 6 illustrate respective enlarged views of a battery lock structure of the electronic device in FIGS. 1, 3 and 5.
Figure 4:
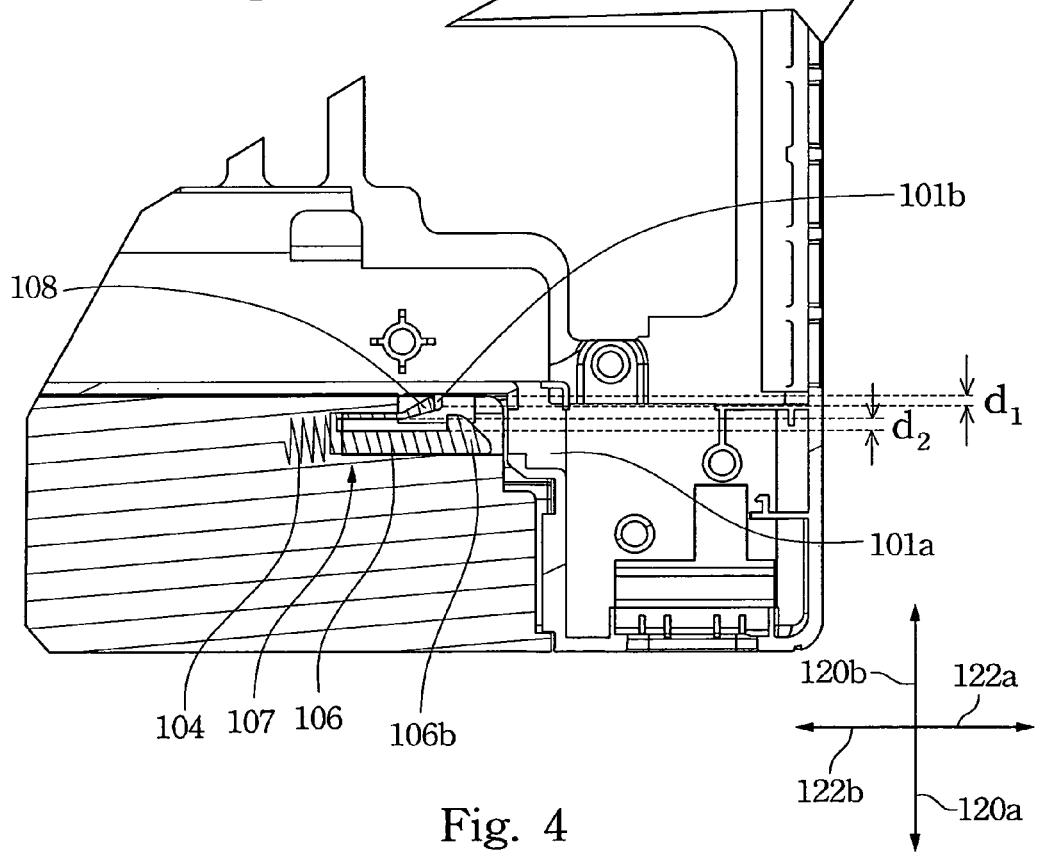
Figure 6:
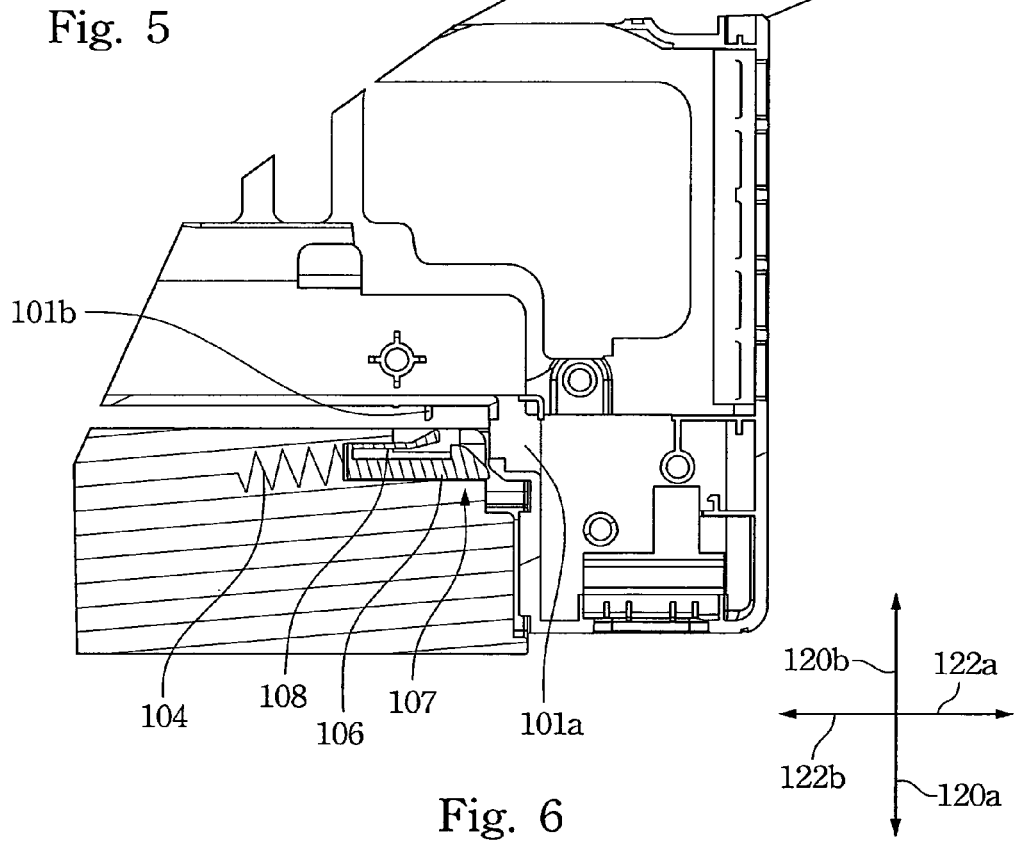

FIGS. 2, 4 and 6 illustrate respective enlarged views of a battery lock structure of the electronic device as illustrated in FIGS. 1, 3 and 5.

FIG. 2 illustrates the battery 102, which is fully accommodated within the concave area 101c of the main body 101. The fasteners 107 both have a main latch 106 and an auxiliary latch 108. The main latch 106 is slidably connected with the battery 102 and slides along a direction 122a that is in substantial parallel with a long axis 106a of the main latch 106. The auxiliary latch 108 is connected with the main latch 106, and slid simultaneously with the main latch 106 relative to the battery 102. That is, the main latch 106 and the auxiliary latch 108 are slid simultaneously relative to the battery 102.

The resilient member 104 provides a resilient force (along the direction 122a) to push the main latch 106 to engage within the latch hole 101a of the main body 101, thereby preventing the battery 102 from being pulled out of the main body 101 along a direction 120a. The auxiliary latch 108 is held by the restricting member 102a of the battery 102, thereby preventing the main latch 106 from slipping out of the battery 102 and overly engaging within the latch hole 101a.

When a user desires to remove the battery 102, the first action is to move the fastener 107 along a direction 122b against the resilient force of the resilient member 104 to the position as illustrated in FIG. 4. An end portion of the auxiliary latch 108 is stopped by the stopping member 101b of the main body 101. Therefore, when the main latch 106 is off the latch hole 101a, the main latch 106 ceases sliding and temporarily stops at that position.

Due to the auxiliary latch 108 engaging with the stopping member 101b, i.e., a transition between FIG. 2 and FIG. 4, the auxiliary latch 108 is bended or deformed along the direction 120a (not illustrated in the drawings). When an end portion of the auxiliary latch 108 goes beyond the stopping member 101b (referring to FIG. 4), the auxiliary latch 108 returns to its original position or shape along the direction 120b. Therefore, a gap $d_2$ between the main latch 106 and the auxiliary latch 108 should be larger than a bended or deformed distance (along the direction 120a) of the auxiliary latch 108 caused by engaging with the stopping member 101b. Besides, the auxiliary latch 108 should be designed to be bendable or deformable along a direction 120a that is substantially perpendicular to the long axis 106a of the main latch 106. In this embodiment, the main latch 106 and the auxiliary latch 108 are manufactured to form a unitary plastic member, and the auxiliary latch 108 has a thinner and shorter cross-section than the main latch 106 has such that the auxiliary latch 108 is capable of being bendable or deformable. In an alternate embodiment, the main latch 106 and the auxiliary latch 108 are manufactured by materials other than plastic materials and not manufactured to form a unitary member.

When two main latches 106 of the battery 102 are both off the latch hole 101a (as illustrated in FIG. 4), the user can remove the battery 102 along the direction 120a (as illustrated in FIG. 6) from the main body 101.

Referring both to FIGS. 4 and 6, when the main latch 106 is off the latch hole 101a, the stopping member 101b stops the auxiliary latch 108, and the stopping member 101b has a width $d_1$ sufficient to enable the main latch 106 not to engage within the latch hole by the resilient force again when the user move the fastener 107 along the direction 120a leading the auxiliary latch 108 off the stopping member 101b. Besides, when the stopping member 101b stops the auxiliary latch 108, a friction therebetween should be sufficient to be even with the resilient force of the resilient member 104, otherwise the main latch 106 would engage within the latch hole 101a again such that the user cannot remove the battery 102 along the direction 120a.

In this embodiment, the resilient member 104 can be a compression spring or other fastener capable of providing a resilient force.

Figure 7:
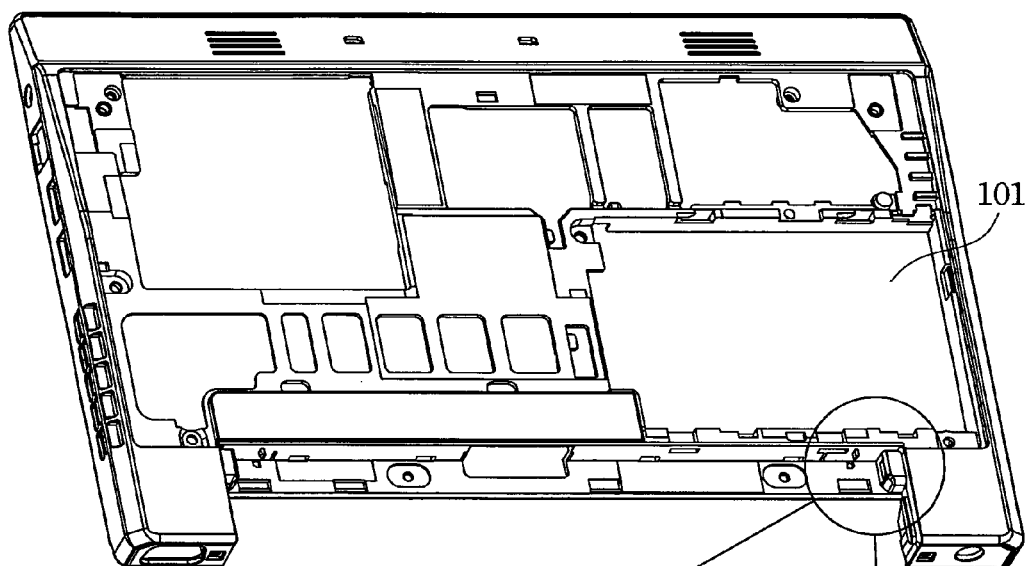
FIG. 7 illustrates a bottom view of an electronic device with its battery removed according an embodiment disclosed herein.
Figure 8:
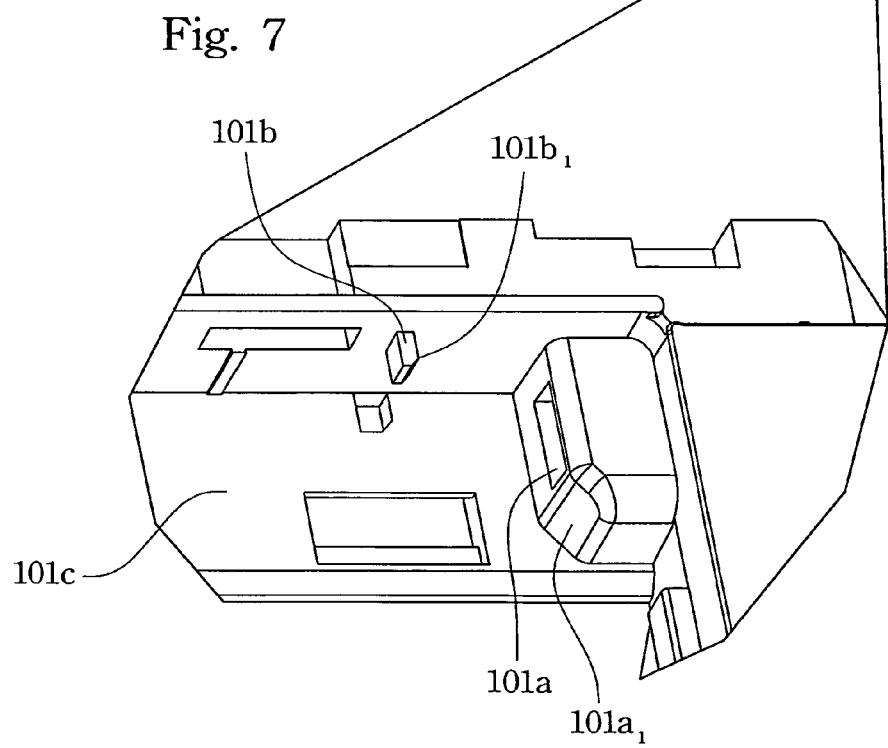
FIG. 8 illustrates an enlarged view of a battery lock structure of the electronic device in FIG. 7.

FIG. 7 illustrates a bottom view of an electronic device with its battery removed according to an embodiment disclosed herein. FIG. 8 illustrates an enlarged view of a battery lock structure of the electronic device in FIG. 7. These two views provide perspective views of the battery lock structure of the electronic device's main body 101. The concave area 101c of the main body 101 has the latch hole 101a and the stopping member 101b. The latch hole 101a has an adjacent slanted surface 101a, to force the main latch 106 along the direction 122b when the battery 102 is assembled to the electronic device 100 along the direction 120b once the end portion 106b (referring to FIG. 2) of the main latch 106 contacts the slanted surface 101a₁. Besides, the stopping member 101b has an adjacent slanted surface 101b₁ to force the auxiliary latch 108 to bend or deform along the direction 120a when the battery 102 is removed along the direction 122b from concave area 101c of the electronic device 100 once an end portion of the auxiliary latch 108 contacts the slanted surface 101b₁.

According to the above-discussed embodiments, the battery lock structure of the electronic device disclosed herein permits a user to pull the main latch 106 away from the latch hole 101 and temporarily position the main latch 106 by means of the stopping member 101b holding the auxiliary latch 108 (referring to FIG. 4). Therefore, the user may use single hand to respectively pull the main latches at two opposite sides of the battery 102 away from the latch holes 101a and then use single hand to remove the battery 102 from the main body 101.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A battery lock structure of an electronic device comprising:
   a battery including a restricting member;
   a main body comprising a concave area for accommodating the battery, the concave area comprising a latch hole and a stopping member;
   a fastener on the battery comprising:
      a main latch slidably connected with the battery and being inserted into the battery; and
      an auxiliary latch connected with the main latch, and that is configured to be slid simultaneously with the main latch relative to the battery; and
   a resilient member being connected with the fastener at an end of the resilient member and connected with the battery at an opposite end of the resilient member, whereby providing a resilient force for the fastener to be secured within the concave area,
   wherein when the battery is fully accommodated within the concave area, the main latch engages within the latch hole, and the restricting member is configured to prevent the main latch from overly engaging with the latch hole and thereby slipping out of the battery,
   wherein when the main latch is off the latch hole, the stopping member stops the auxiliary latch, and the stopping member has a width sufficient to enable the main latch not to engage within the latch hole when the auxiliary latch is moving in a direction to be off the stopping member,
   wherein a gap between the main latch and the auxiliary latch is larger than a bended distance of the auxiliary latch caused by the auxiliary latch engaging with the stopping member, the auxiliary latch has a thinner and shorter cross-section than that of the main latch.

2. The battery lock structure of claim 1, wherein the main latch slides along a first direction that is substantially parallel with a long axis of the main latch.

3. The battery lock structure of claim 2, wherein the auxiliary latch is bendable along a second direction that is substantially perpendicular to the long axis of the main latch.

4. The battery lock structure of claim 1, wherein the main latch and the auxiliary latch are manufactured to form a unitary plastic member.

5. The battery lock structure of claim 1, wherein the resilient member comprises a compression spring.

6. The battery lock structure of claim 1, wherein the resilient member touches the battery.

* * * * *